(12) United States Patent
Kim

(10) Patent No.: US 7,020,409 B2
(45) Date of Patent: Mar. 28, 2006

(54) APPARATUS FOR SUPPLYING VOLTAGE TO DEVELOPING DEVICE

(75) Inventor: Min-Seon Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 349 days.

(21) Appl. No.: 10/616,493

(22) Filed: Jul. 10, 2003

(65) Prior Publication Data

US 2004/0075346 A1 Apr. 22, 2004

(30) Foreign Application Priority Data

Jul. 10, 2002 (KR) ................ 2002-40106

(51) Int. Cl.
  *G03G 15/01* (2006.01)
  *G03G 15/06* (2006.01)
(52) U.S. Cl. .................................. 399/88; 399/228
(58) Field of Classification Search ............... 399/223, 399/225, 228, 229, 88, 53, 54, 55, 234, 235; 347/115, 117
  See application file for complete search history.

(56) References Cited

U.S. PATENT DOCUMENTS

| | | | | |
|---|---|---|---|---|
| 4,924,806 A | * | 5/1990 | Mizuno et al. | ............ 399/225 |
| 5,376,998 A | * | 12/1994 | Suzuki | ................ 399/88 |
| 5,627,722 A | * | 5/1997 | Hirst | .............. 399/228 X |
| 5,862,438 A | * | 1/1999 | Folkins | .............. 399/88 |
| 6,807,394 B1 | * | 10/2004 | Yoo | ................ 399/228 |
| 2002/0067929 A1 | * | 6/2002 | James et al. | .......... 399/88 |
| 2004/0005165 A1 | * | 1/2004 | Yoon et al. | ............ 399/88 |
| 2004/0067078 A1 | * | 4/2004 | An et al. | .............. 399/285 |
| 2004/0175197 A1 | * | 9/2004 | Kyung | ................ 399/55 |

FOREIGN PATENT DOCUMENTS

| | | | |
|---|---|---|---|
| JP | 04-043372 A | * | 2/1992 |
| JP | 05-197254 A | * | 8/1993 |

* cited by examiner

*Primary Examiner*—Sophia S. Chen
(74) *Attorney, Agent, or Firm*—Staas & Halsey LLP

(57) ABSTRACT

An apparatus for supplying a high voltage to a plurality of developer units has a high voltage source generating the high voltage, and a voltage switching unit including a plurality of switching elements provided between the plurality of developer units and the high voltage source to sequentially supply the voltage from the high voltage source to the plurality of developer units. The high voltage source supplies one voltage of a predetermined voltage level to the respective switching elements. The voltage switching unit has a plurality of high voltage distributing portions branching the voltage supplied to the switching elements into one or more voltages of differing voltage levels, and supplying the branch voltages and the initially supplied voltage to the respective developer units. A number of wiring harnesses or patterned connection lines, and contact-points and noise from the high voltage are reduced.

23 Claims, 7 Drawing Sheets

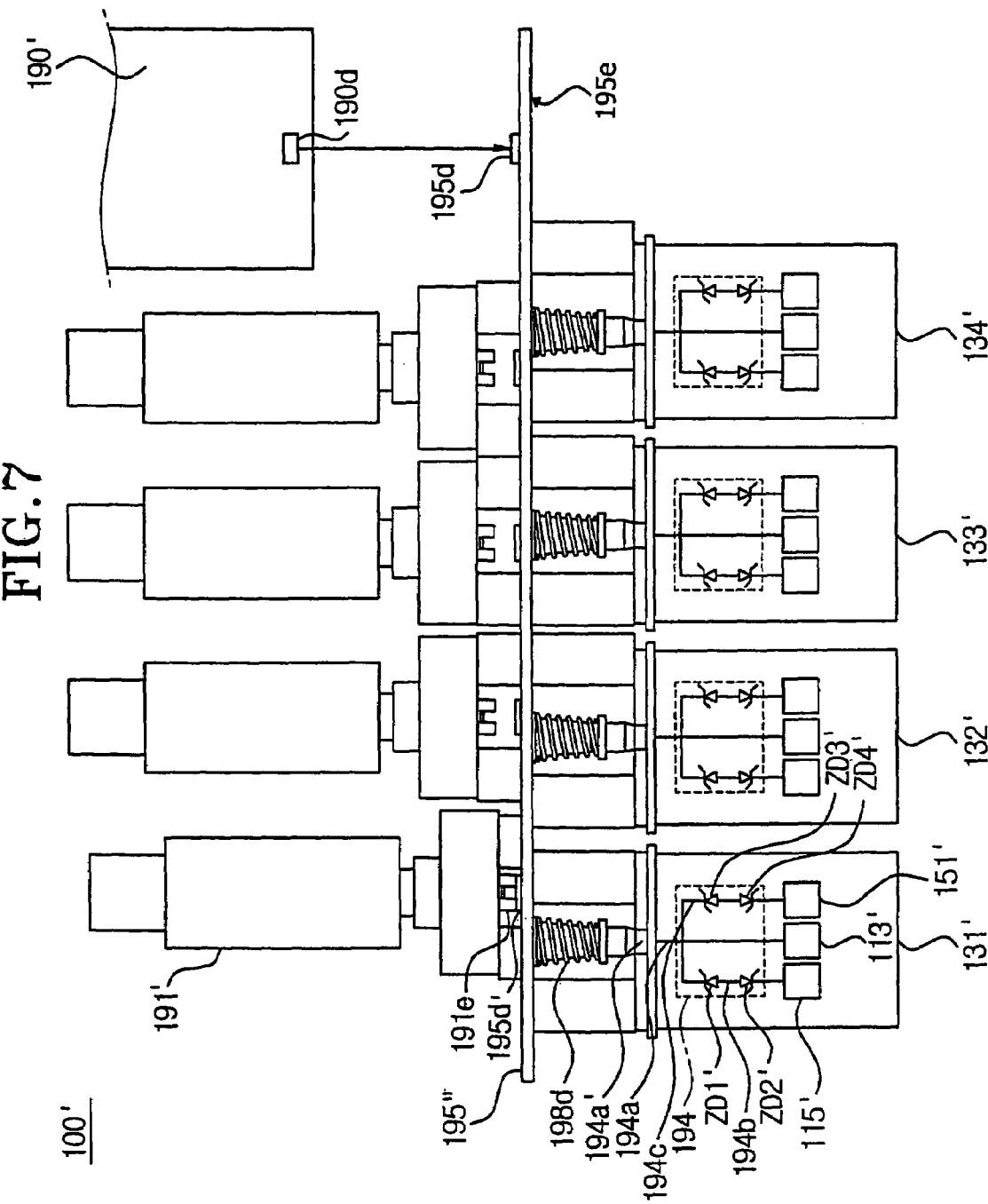

APPARATUS FOR SUPPLYING VOLTAGE TO DEVELOPING DEVICE

CROSS-REFERENCE TO RELATED APPLICATION

This application claims the benefit of Korean Patent Application No. 2002-40106, filed Jul. 10, 2002, in the Korean Intellectual Property Office, the disclosure of which is incorporated herein by reference.

BACKGROUND OF THE INVENTION

1. Field of the Invention

The present invention generally relates to a electrophotographic color image forming apparatus such as a color photocopier or a color printer, having a plurality of electrophotographic developing devices, and more particularly, to a voltage supply apparatus of the developing device to supply high voltage to the plurality of developing devices for color printing or color photocopying.

2. Description of the Related Art

FIG. 1 shows a general conventional electrophotographic color image forming apparatus 10 such as a color photocopier or a color printer, having a photoreceptor body 11 formed in a drum shape which is continuously revolved in a predetermined direction by a driving source (not shown).

Formed in a proximity of an outer circumference of the photoreceptor body 11 are: a charging unit 12, a laser scanning unit (LSU) 20, four slidable developer units 31, 32, 33 and 34 as yellow, magenta, cyan and black slidable units, respectively, each containing developers representing yellow, magenta, cyan and black colors, respectively, a transfer transporting portion 60, an erasing lamp 87 and a cleaning discharging portion 80, all formed in a successive order of a rotational direction of the photosensitive body 11.

The charging unit 12 may be a scrotron, and may evenly charges the photoreceptor body 11. The LSU 20 exposes the photoreceptor body 11 to a light source such as a laser source axially in a linear fashion.

Each of the slidable developer units 31, 32, 33 and 34 includes a developer roller 13, a developer reservoir 16, a developer feeding roller 15 and a developer layer thickness regulating member, for example, a blade 51 that regulates a thickness of the developer attached onto the developer roller 13. The slidable developer units 31, 32, 33 and 34 are driven by a developer driving source (not shown), respectively. A developer is fed to the developer roller 13 through the developer feeding roller 15 of the developer reservoir 16 and a predetermined high voltage is applied. The thickness of the developer on the developer roller 13 is regulated to be thin by the developer layer thickness regulating member 51 that applies a predetermined voltage for an electric charge supply.

The respective slider developer units 31, 32, 33 and 34 are slidable, and are movably supported to reciprocate in a developer guiding member (not shown). The slidable developer units 31, 32, 33 and 34 are each moved toward the photoreceptor body 11 and against releasing springs 74 by first to fourth eccentric cams 35, 36, 37 and 38 which are fixed on rotary axes 56. A rotation of the rotary axes 56 is controlled by an electric clutch (not shown).

During a developing process, a developing bias voltage is applied to the developer roller 13. With a negative-positive reversal process, the developing bias voltage becomes identical to a charging polarity of the photoreceptor body 11.

The transfer transporting portion 60 electro magnetically transfers a color image on the photoreceptor body 11 onto a recording medium such as a paper P, and the cleaning discharging portion 80 removes remaining developer from the photoreceptor body 11.

An operation of the image forming apparatus 10 as above constructed is described in detail. With a reception of a printing command, the photoreceptor body 11 is continuously revolved by a photoreceptor driving source (not shown), during which a surface of the photoreceptor body 11 is evenly charged by the charging unit 12. When a charged region reaches a yellow image developing position (d) of the yellow developer unit 31 for a color image to first form, for example, a yellow image, the electric clutch of the yellow slidable developer unit 31 is turned on, and the yellow slidable developer unit 31 is moved toward the photoreceptor body 11 to be set in a developing state.

The surface of the photoreceptor body 11 is exposed to the LSU 20, thereby having a yellow electrostatic latent image formed thereon. In the yellow image developing position (d), the yellow image is continuously formed from a leading to a tail end of the color image by the yellow slidable developer unit 31.

With a completion of the yellow image and passing of the tail end of the yellow image through the yellow image developing position (d), the first eccentric cam 35 rotates thereby causing the yellow slidable developer unit 31 to separate apart from the photoreceptor body 11.

As the leading end of the yellow image reaches a magenta image developing position (e) of the magenta slidable developer unit 32, for a color image to secondly form, for example, a magenta image, the electric clutch of the magenta slidable developer unit 32 turns on. Accordingly, the magenta slidable developer unit 32 is set by the second eccentric cam 36 to a developing state.

The yellow image on the photoreceptor body 11 is passed through the transfer transporting portion 60, the erasing lamp 87 and the cleaning discharging portion 80 which are not in operation, and positioned below the charging unit 12. The transfer transporting portion 60 and the cleaning discharging portion 80 are formed so as not to contact with the photoreceptor body 11 to prevent a smearing of the image passing therebetween.

The photoreceptor body 11 having the yellow image formed thereon under the charging unit 12 is again uniformly charged by the charging unit 12, and the magenta image is overlapped on the yellow image by exposing the photoreceptor body 11 to light from the LSU 20, and developed in the magenta image developing position (e) by the magenta slidable developer unit 32. With a completion of forming of the magenta image, the tail end of the image passes through the magenta image developing position (e), and the second eccentric cam 36 rotates. As a result, the magenta developer unit 32 is separated apart from the photoreceptor body 11.

When the leading end of the image reaches a cyan image developing position (f) of the cyan slidable developer unit 33 for a color image to be thirdly formed, for example, a cyan image, an electric clutch of the cyan slidable developer unit 33 turns on so that the cyan slidable developer unit 33 is set at a developing state.

A composite image of the yellow and magenta images passes through the transfer transporting portion 60 and the erasing lamp 87 and is positioned below the charging unit 12. The photoreceptor body 11 is evenly (i.e., uniformly) charged by the charging unit 12. The composite image of the yellow and magenta images is overlapped with the cyan image by exposing the photoreceptor body 11 to light from the LSU 20, and developed in the cyan image developing position (f) by the cyan slidable developer unit 33. After a completion of the forming of cyan image, the tail end of the image is passed through the cyan image developing position (f), the third eccentric cam 37, rotates and the cyan slidable developer unit 33 is separated apart from the photoreceptor body 11.

A black image is overlapped and formed in a same way described above, thus forming of an entire image is complete. That is, when the leading end of the image reaches a black image developing position (g) of the black slidable developer unit 34 for a color image to be fourthly formed, for example, a black image, an electric clutch of the black slidable developer unit 34 turns on so that the black slidable developer unit 34 is set at a developing state. The color image on the photoreceptor body 11 is transferred by the transfer transporting portion 60 to a recording medium P, which is synchronously transported from a recording medium feeding portion.

After the image transfer, the photoreceptor body 11 is discharged by the erasing lamp 87, and as a remaining developer on the surface of the photoreceptor body 11 is removed by a rotary brush 81 of the cleaning discharging portion 80, the photoreceptor body 11 returns to an initial state. The recording medium P with the color image formed thereon is transported to the recording medium fusing portion (not shown), and after the colors are fixed on the recording medium P at the recording medium fusing portion, the recording medium P is discharged externally.

With the construction of the conventional photoelectrographic color image forming apparatus 10 as described above, since the four slidable developer units 31, 32, 33 and 34 are brought to contact with the photoreceptor body 11 under a predetermined pressure, or slid away from the photoreceptor body 11, the photoreceptor body 11 is in contact with the developer rollers 13 of the four slidable developer units 31, 32, 33 and 34 four times during one cycle of the photoreceptor body 11.

As shown in FIG. 2, power supply sliding contact-point terminals 13a, 15a and 51a connected to the developer rollers 13, the developer feeding rollers 15 and the developer layer thickness regulating members 51 of the four slidable developer units 31, 32, 33 and 34 are sequentially connected to, or disconnected from, stationary contact-point terminals 90a', 90b', 90c', respectively, which are connected to corresponding voltage supplies of high voltage power supply (HVPS) 90, i.e., to a developer roller voltage unit 90a, a developer feeding roller voltage unit 90b and a developer layer thickness regulating blade voltage unit 90c through a complex wiring harness.

However, in the conventional electrophotographic color image forming apparatus 10 constructed as above, complicated structures of the first to fourth eccentric cams 35, 36, 37 and 38, cam driving motors (not shown) and the electric clutches are required for a sequential use of the four slidable developer units 31, 32, 33 and 34.

Further, a shock is generated from the contact of the photoreceptor body 11 with the developer rollers 13 of the four slidable developer units 31, 32, 33 and 34 at a time of changing from one slidable developer unit 31, 32, 33 or 34 to another slidable developer unit 31, 32, 33 or 34, and the shock is directly transmitted to the photoreceptor body 11 in a developing process. Thus, a lifespan of the photoreceptor body 11 is shortened, and the photoreceptor body 11 is subjected to speed changes, and jittering occurs deteriorating printing quality.

Further, a power supply apparatus supplying a high voltage to the slidable developer units 31, 32, 33 and 34 of the conventional electrophotographic color image forming apparatus 10 has a complicated construction in which the voltage units 90a, 90b and 90c of the HVPS 90 are connected with the stationary contact-point terminals 90a', 90b' and 90c', respectively, through the complex wiring harness causing a complicated manufacture process. Further, a sliding contact of the sliding contact-point terminals 13a, 15a and 51a with the stationary contact-point terminals 90a', 90b' and 90c' causes a degradation of a reliability in switching of high voltage contact-points.

To overcome the above-mentioned problems of the conventional electrophotographic color image forming apparatus 10 using the above sliding type developer units 31, 32, 33 and 34, is an image forming apparatus (not shown) having stationary developer units 31', 32', 33' and 34' secured in a spaced-apart relation with a photoreceptor body to have a predetermined gap, i.e., 0.2 mm (see FIGS. 3 and 4).

The image forming apparatus includes a HVPS 90' having a developer roller voltage unit 90d, a developer feeding roller voltage unit 90e, and a developer layer thickness regulating member voltage unit 90f; stationary contact-point terminals 13a', 15a' and 51a' of the stationary developer units 31', 32', 33' and 34' secured at the predetermined gap with respect to the photoreceptor body instead of either contacting or isolating the stationary developer units 31', 32', 33' and 34' with respect to the photoreceptor body 11; and a coupling printed circuit board (PCB) 95 that connects the voltage units 90d, 90e and 90f of the HVPS 90' with the stationary contact-point terminals 13a', 15a' and 51a' of the stationary developer units 31', 32', 33' and 34'.

The coupling PCB 95 includes: first, second and third PCB input terminals 95d, 95e and 95f connected with the voltage units 90d, 90e and 90f of the HVPS 90' through wiring harnesses; first, second and third PCB output terminals 95d', 95e' and 95f' connected to corresponding stationary contact-point terminals 13a', 15a' and 51a' of the respective stationary developer units 31', 32', 33' and 34' through first, second and third spring terminals 98d, 98e and 98f of the respective stationary developer units 31', 32' 33' and 34'; and four solenoids 91 each having first, second and third solenoid input terminals 91d, 91e and 91f, which are connected to the first, second and third PCB input terminals 95d, 95e and 95f, respectively, through a connecting line patterned in the coupling PCB 95, and first, second and third output switching terminals 91d', 91e' and 91f' connected to the first, second and third PCB output terminals 95d', 95e' and 95f' for switching.

According to the image forming apparatus that uses the stationary developer units 31', 32', 33' and 34', the stationary developer units 31', 32', 33' and 34' are stationary, thus not movable to contacted with, or to be isolated from the photoreceptor body. Accordingly, a deterioration of printing quality and a lifespan of the photoreceptor body due to a contacting shock is improved, while a complicated construction using wiring harnesses is simplified by using the coupling PCB 95 as a power supply apparatus. However, problems still remain because of the complicated construction due to the wiring harnesses required to supply power from the HVPS 90', the connecting lines patterned in the PCB 95, and the contact-points for high voltage switching. Further, noise from an application of high voltage occurs during a change from one stationary developer unit 31', 32', 33' or 34' to another stationary developer unit 31', 32', 33' or 34', and a reliability in switching of the high voltage contact-points deteriorates.

SUMMARY OF THE INVENTION

Additional aspects and/or advantages of the invention will be set forth in part in the description which follows and, in part, will be obvious from the description, or may be learned by practice of the invention.

Accordingly, it is an aspect of the present invention to provide a power supply apparatus of a developing device having a simplified structure of a reduced number of high voltage wiring harnesses, patterned connecting lines and contact-points for high voltage switching, capable of reducing noise from high voltage and improving a reliability of switching of the high voltage contact-points during a change of one developer unit to another.

It is another aspect to provide a power supply apparatus of a developing device having voltage distributing units that change one high voltage fed from a high voltage supply source into high voltages of at least two different levels by using zener diodes.

To accomplish the above and/or other aspects, an apparatus for supplying a high voltage to a plurality of developer units includes a high voltage source generating a high voltage, a voltage switching unit comprising a plurality of switching elements provided between the plurality of developer units and the high voltage source to sequentially supply the high voltage from the high voltage source to the plurality of developer units, the high voltage source supplying one voltage of a predetermined voltage level to the respective switching elements of the voltage switching unit, and the voltage switching unit comprising a plurality of a high voltage distributing unit branching the voltage supplied to the respective switching elements into one or more voltages of differing voltage levels, and supplying the branching voltages and the initially supplied voltage to the respective developer units.

Each of the high voltage distributing units may include a reference voltage transmitting unit transmitting the one voltage of a predetermined voltage level, between an output terminal of the voltage switching unit and a corresponding one of the plurality of the switching elements, an output terminal of the voltage switching unit being connected with one of stationary contact-point terminals of constituent parts (i.e., hereafter collectively referring to a developer roller, a developer feeding roller and a developer layer regulating member) of each of the developer units, which require a high voltage, and one or more branch voltage generating units arranged in parallel with the reference voltage transmitting unit and connected to one or more remaining output terminals of the voltage switching unit and comprising one or more zener diodes, the remaining output terminals of the voltage switching unit being connected with corresponding remaining ones of the stationary contact-point terminals of the constituent parts of each of the developer units which require high voltage.

Each of the branch voltage generating units may comprise two zener diodes arranged in series.

The voltage switching unit comprises a printed circuit board having solenoids serving as the plurality of the switching elements.

An apparatus for supplying a high voltage to a plurality of developer units may include a high voltage source generating a high voltage, a voltage switching unit comprising a plurality of switching elements provided between the plurality of developer units and the high voltage source to sequentially supply the high voltage from the high voltage source to the plurality of developer units, the high voltage source supplying one voltage of a predetermined voltage level to respective switching elements of the voltage switching unit, and each of the developer units comprising a high voltage distributing unit branching the one voltage of the predetermined voltage level supplied via the corresponding switching element into one or more voltages, and supplying the one or more branched voltages and the high voltage.

The high voltage distributing unit may include a reference voltage transmitting unit transmitting the one voltage of the predetermined voltage level between an input terminal of the developer unit and one of contact-point terminals of constituent parts of the developer unit which require a high voltage, the input terminal of the developer unit being connected with an output terminal of the voltage switching unit which is connected with each of the switching elements, and one or more branch voltage generating units arranged in parallel with the reference voltage transmitting unit, and connected with remaining ones of the contact-point terminals of the constituent parts of the developer unit which require high voltages, and having one or more zener diodes.

Each of the branch voltage generating units may comprise two zener diodes arranged in series.

The voltage switching unit includes a printed circuit board having solenoids serving as the switching elements.

BRIEF DESCRIPTION OF THE DRAWINGS

These and other aspects and advantages of the invention will become apparent and more readily appreciated from the following description of the preferred embodiments, taken in conjunction with the accompanying drawings of which:

FIG. 7 is a side view showing a connection among a high voltage power source, a voltage switching unit and respective developer units of the power supply apparatus of FIG. 6.

DETAILED DESCRIPTION OF THE PREFERRED EMBODIMENTS

Figure 1:
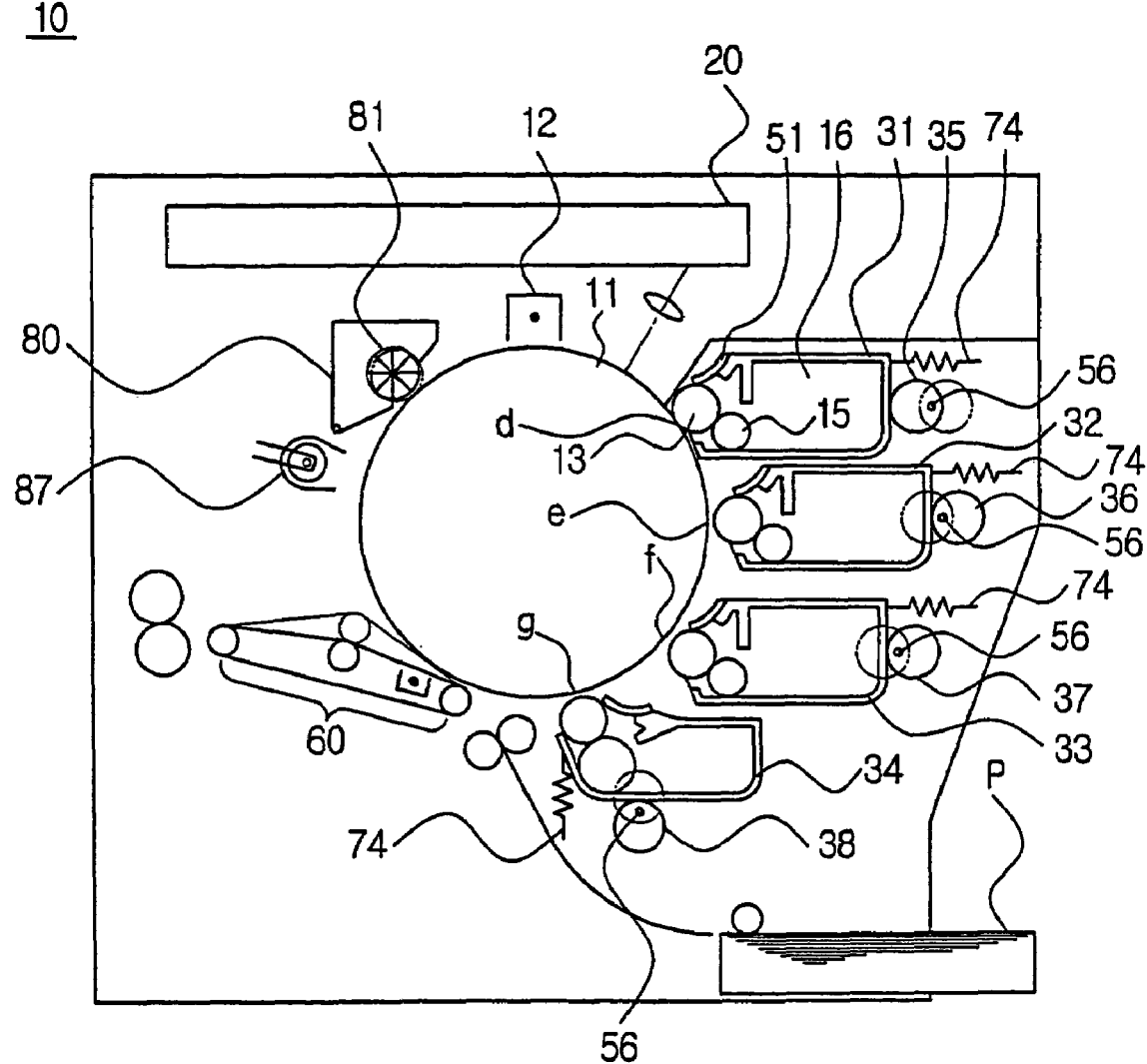
FIG. 1 is a schematic view of a general conventional electrophotographic color image forming apparatus.
Figure 2:
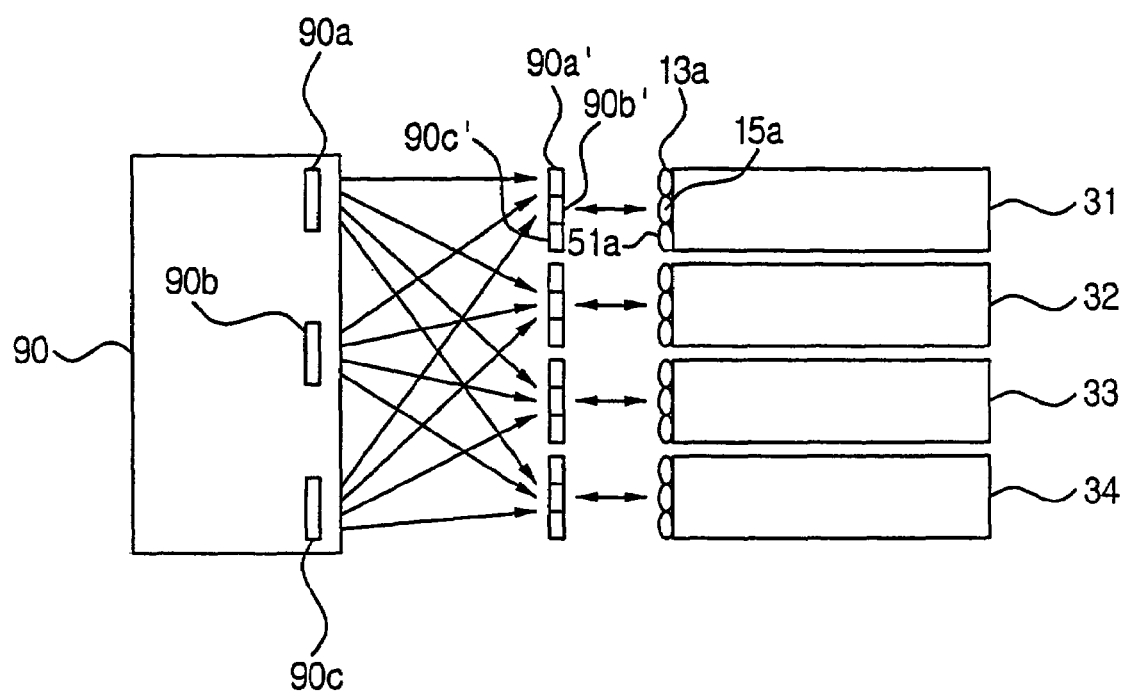
FIG. 2 is a schematic view of a power supply apparatus of a developing device used in the electrophotographic color image forming apparatus of FIG. 1.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 5:
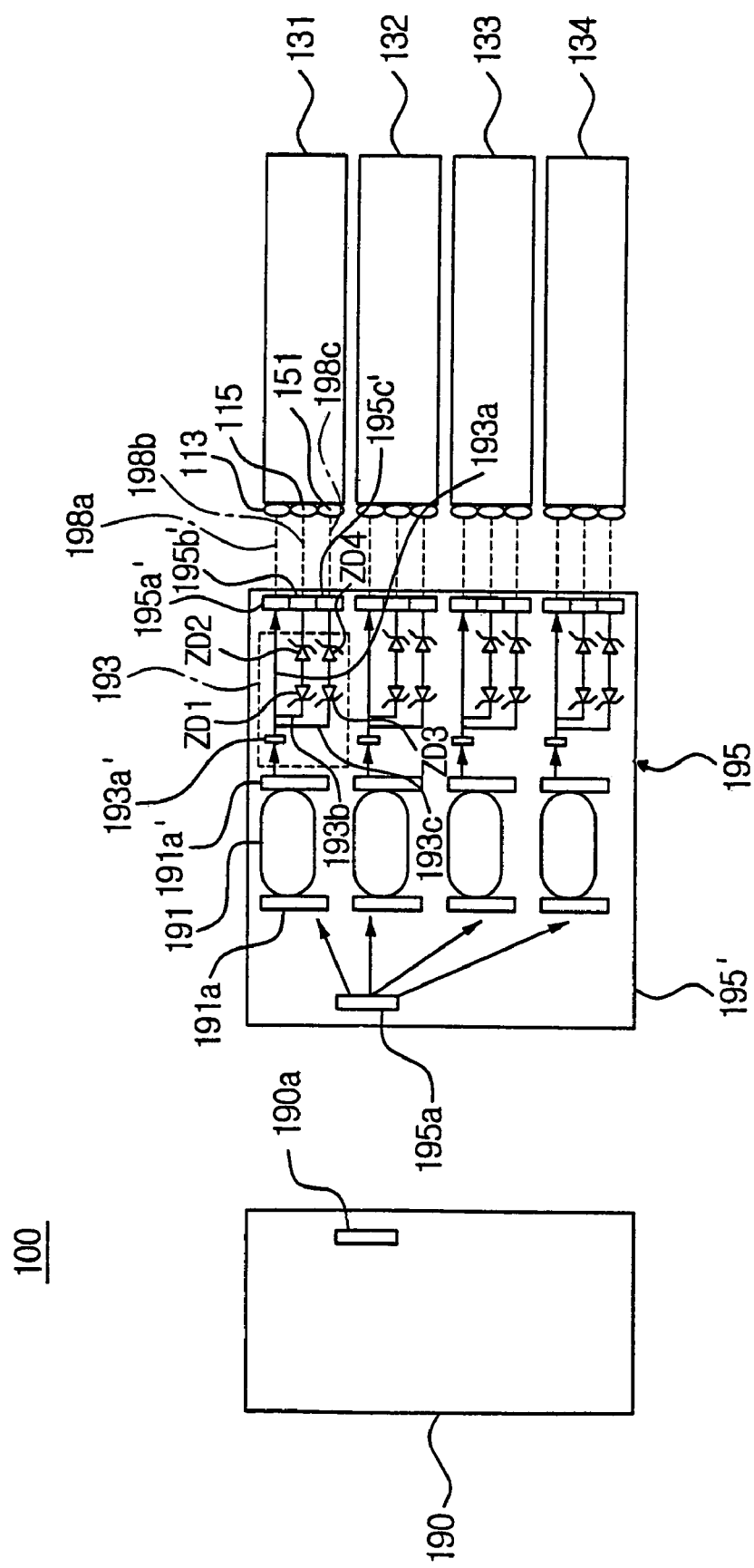
FIG. 5 is a schematic view of a power supply apparatus of a developing device used in an electrophotographic color image forming apparatus according to a first embodiment of the present invention.

FIG. 5 is a schematic view showing a power supply apparatus of a developing device according to a first embodiment of the present invention.

Referring to FIG. 5, the power supply apparatus 100 includes a photoreceptor body (not shown) in a shape of cylinder drum that forms an electrostatic latent image thereon using a potential difference of a surface thereof, and stationary developer units 131, 132, 133 and 134, each containing developers for four colors, i.e., yellow, magenta, cyan and black, and having a developer roller (not shown) secured in a spaced-apart relation with the photoreceptor body to have a predetermined gap, for example, in a range of 0.2 mm.

To supply high voltages to the respective stationary developer units 131, 132, 133 and 134, the voltage supply apparatus 100 includes a high voltage source 190 generating high voltages, and a voltage switching unit 195' having a plurality of switching elements formed in an arrangement so as to switch a initial voltage applied from the high voltage source 190 into output voltages of at least three different voltage levels and then sequentially supply the switched voltages to the stationary developer units 131, 132, 133 and 134.

The high voltage source 190 has a reference voltage unit 190a supplying only one voltage of certain level (hereinafter, "reference voltage") to the voltage switching unit 195'. Accordingly, a number of contact points of a wiring harness is reduced from the conventional voltage supply apparatus of FIG. 3 by 2 contact points.

The voltage switching unit 195' is formed on a coupling printed circuit board (PCB) 195, and includes one or more PCB input terminals 195a connected to the reference voltage unit 190a via the wiring harness, four corresponding solenoids 191 to sequentially switch, thus supplying the reference voltage from the one or more PCB input terminals 195a to the four stationary developer units 131, 132, 133 and 134, four voltage distributing units 193 branching the reference voltage from the corresponding solenoids 191 into two output voltages and the reference voltage, respectively, and first, second and third PCB output terminals 195a', 195b' and 195c' to output the two output voltages and the reference voltage, respectively, from the voltage distributing units 193 to an outside of the voltage switching unit 195'.

The one or more PCB input terminals 195a are connected to input terminals 191a of the four solenoids 191 via four patterned connecting lines formed in the coupling PCB 195.

Figure 3:
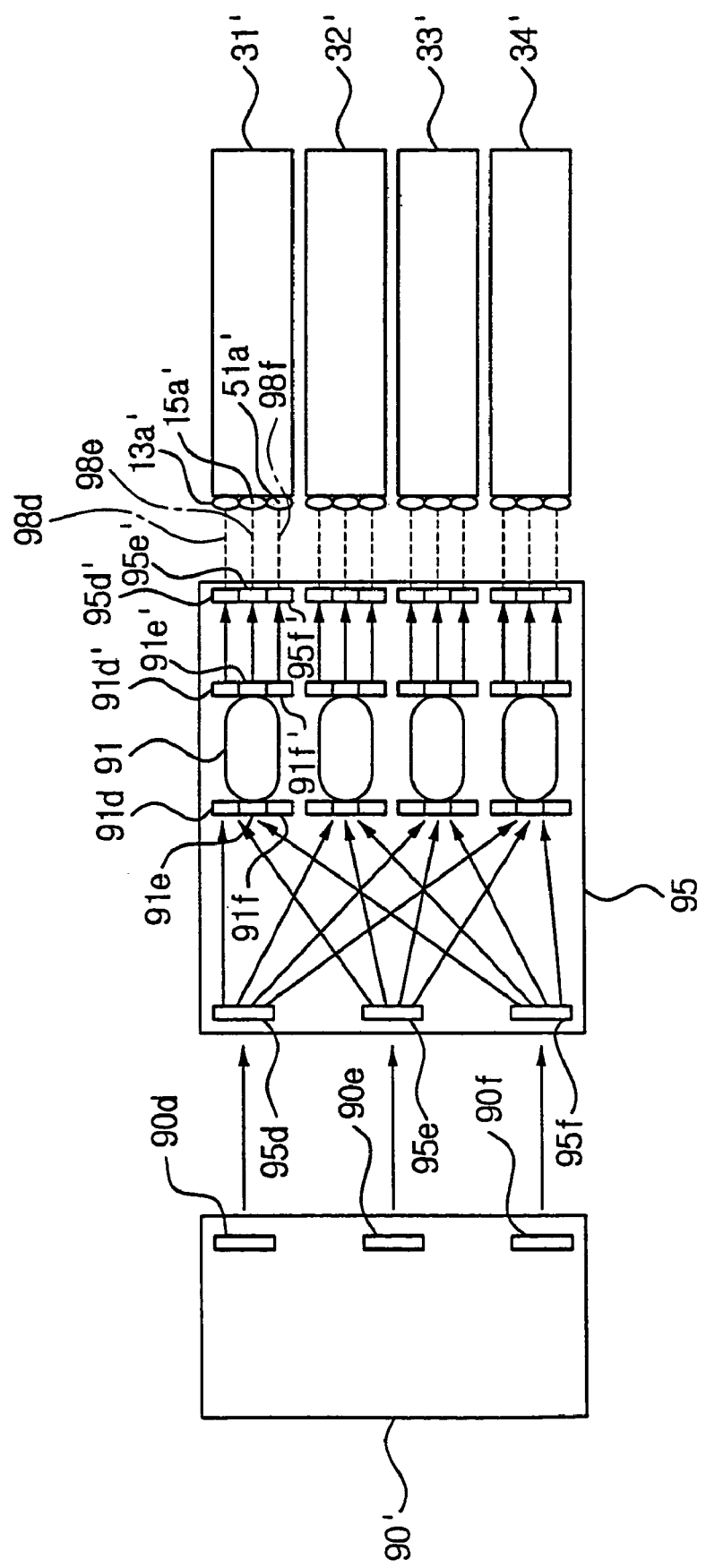
FIG. 3 is a schematic view of a power supply apparatus of a developing device used in a second type of conventional color electrophotographic image forming apparatus.
Figure 4:
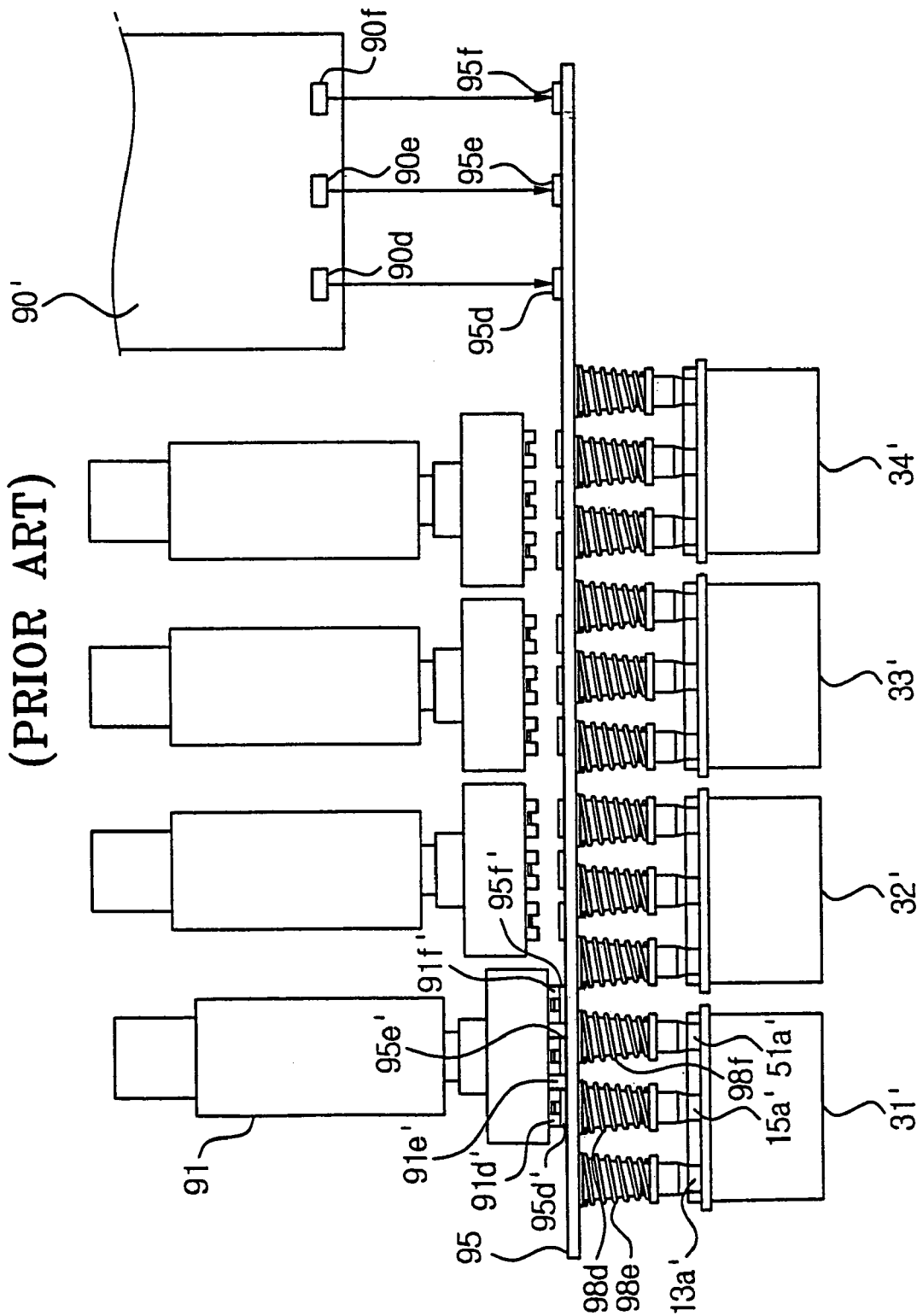
FIG. 4 is a side view showing a connection among a high voltage power source, a voltage switching unit and respective developer units of the power supply apparatus of FIG. 3.

As described above, the voltage supply apparatus 100 may have one PCB input terminal 195a and one input terminal 191a of each solenoid 191. Accordingly, unlike the conventional voltage supply apparatus, as shown in FIG. 3 in which complicated patterned connecting lines are formed to connect the first, the second and the third PCB input terminals 95d, 95e and 95f with the first, the second and the third input terminals 91d, 91e and 91f of the respective solenoids 91, complicated patterned connecting lines are not required according to the embodiment of the present invention.

Output switching terminals 191a' of the respective solenoids 191 are arranged such that the output switching terminals 191a' of the respective solenoids 191 are switched to input terminals 193a' of the corresponding voltage distributing units 193.

Each of the voltage distributing units 193 includes: a reference voltage transmitting unit 193a to transmit a reference voltage between the first PCB output terminals 195a', which are connected to stationary contact-point terminals 113 of the developer roller (not shown) of the stationary developer unit that requires a high voltage supply, and the input terminals 193a' of the corresponding voltage distribution units 193 that are connected to the output switching terminals 191a' of the respective solenoids 191; and first and second branch voltage generating units 193b and 193c arranged in parallel relation to the reference voltage transmitting units 193a and connected to the second and the third PCB output terminals 195b' and 195c' that are connected with stationary contact-points terminals 115 and 151 of the developer feeding roller (not shown) and the developer layer thickness regulating member (blade) (not shown), respectively.

Each of the reference voltage transmitting units 193a comprises an electric line patterned in the coupling PCB 195 and connected to the stationary contact-point terminal 113 of the developer roller of the corresponding stationary developer unit 131, 132, 133 and 134 via the first PCB output terminal 195a' and a first spring terminal 198a. The first and second branch voltage generating units 193b and 193c each comprises electric lines with first and second zener diodes ZD1 and ZD2 forming the first branch voltage generating unit 193b and third and fourth zener diodes ZD3 and ZD4 forming the second branch voltage generating unit 193c, respectively, connected to the stationary contact-point terminals 115 and 151 of the developer feeding roller and the developer layer thickness regulating member of the corresponding stationary developer unit through the second and the third PCB output terminals 195b' and 195c' and the second and the third spring terminals 198b and 198c.

The pairs of zener diodes ZD1 and ZD2; ZD3 and ZD4 of the first and the second branch voltage generating units 193b and 193c serve to amplify the reference voltage of the reference voltage transmitting unit 193a into a constant voltage of an output level as required.

Generally, a voltage supplied to the developer rollers is less than a voltage fed to the developer feeding rollers or to the developer layer thickness regulating member by, approximately 100–400V. Accordingly, a number of zener diodes provided for each of the respective branch voltage generating units 193b or 193c is not limited to 2 diodes. That is, the number of zener diodes is variable depending on the constant voltage required by the developer rollers, the developer feeding rollers and the developer layer thickness regulating members.

The first, second and third PCB output terminals 195a', 195b', 195c' output the voltages from the reference voltage transmitting units 193a and the first and second branch voltage generating units 193b and 193c of the respective voltage distributing units 193, to an outside of the coupling PCB 195, and are directly connected to the stationary contact-point terminals 113, 115 and 151 of the developer roller, the developer feeding roller and the developer layer thickness regulating member via the first, second and third spring terminals 198a, 198b and 198c.

As described above, the voltage supply apparatus 100 supplies only one voltage to the voltage switching unit 195' from the high voltage source 190, so that a number of wiring harnesses between the high voltage source 190 and the voltage switching unit 195' and a number of patterned connecting lines between the PCB input terminals 195a of the voltage switching unit 195' and the input terminals 191a of the respective solenoids 191 is reducable, respectively. Thus, the voltage supply apparatus 100 has a simplified structure, and a reduced noise from high voltage during a change of one stationary developer unit 131, 132, 133 or 134 to another stationary developer unit 131, 132, 133 or 134.

The operation of the voltage supply apparatus 100 constructed as above will be described below with reference to FIG. 5.

First, with a reception of a print command, an electrostatic latent image is formed on the photoreceptor body. As an image-formed portion of the photoreceptor body, for example, a portion of the yellow electrostatic latent image is moved by a driving source that rotates the photoreceptor body to a developing position of a corresponding stationary developer unit, that is, the yellow stationary developer unit 131, the developer feeding roller and the developer roller of the yellow stationary developer unit 131 are rotated in a direction opposite to that of the photoreceptor body to feed the developer onto the photoreceptor body.

In such a situation, the voltage supply apparatus 100 operates the respective solenoid 191 (i.e., the solenoid corresponding to the yellow stationary developer unit 131) to switch the input terminal 193a' of the voltage distributing unit 193 connected to the stationary contact-point terminals 113, 115 and 151 of the yellow stationary developer unit 131, to thereby supply predetermined voltages to the developer roller, the developer feeding roller and the developer layer thickness regulating member of the yellow stationary developer unit 131.

According to the operation of the respective yellow solenoid 191, the reference voltage fed from the reference voltage unit 190a of the high voltage source 190 to the solenoid input terminal 191a via the one or more PCB input terminals 195a, is fed to the input terminal 193a' of the voltage distributing unit 193 via the output switching terminal 191a'.

Further, the reference voltage is applied to the stationary contact-point terminal 113 of the developer roller via the first PCB output terminal 195a' and an electric line of the reference voltage transmitting unit 193a, while the reference voltage is applied to the stationary contact-point terminals 115 and 151 of the developer feeding roller and the developer layer thickness regulating member via the second and the third PCB output terminals 195b' and 195c' and electric lines of the first and second branch voltage generating units 193b and 193c, respectively, being in a parallel connection with the electric line of the reference voltage generating unit 193a.

Thus, the developer fed by the developer feeding roller to the developer roller is moved by a potential difference of the developer feeding roller and the developer roller. More specifically, the developer is moved onto a surface of the developer roller of a relatively low electric potential. A thickness of the developer layer on the surface of the developer roller is regulated by the developer layer thickness regulating member that applies a predetermined quantity of electric charge through a frictional electrification.

Further, the developer is moved across the gap of, for example, 0.2 mm between the photoreceptor body and the developer roller to the electrostatic latent image on the photoreceptor body by electric fields formed due to the potential difference between the electrostatic latent image on the photoreceptor body and the developer roller. By the developer, the electrostatic latent image is turned into a visible image.

With a completion of a forming of a yellow image, the tail end of the yellow image is passed through the developing position. Then as the leading end of the yellow image reaches the developing position of the second color image, i.e., as the leading end of the yellow image reaches the developing position of the magenta stationary developer unit 132, for example, the magenta developer unit 132 performs image forming in a same way as described above.

Further, the yellow image formed on the photoreceptor body is passed through the transfer transporting unit (not shown), the erasing lamp (not shown) and the cleaning discharging unit (not shown) which are not in operation, and, thus, the yellow image is positioned again under the charging unit (not shown). The photoreceptor body with the yellow image formed thereon is evenly charged by the charging unit thereunder. After the processes of light exposure to LSU (not shown), a magenta image corresponding to the magenta color is overlapped on the yellow image, and is developed by the magenta stationary developer unit 132 at the magenta developing position.

After all of the other images of other colors, such as cyan and black, are formed in the same way described above through the overlapping, forming of an entire image is completed.

After that, the color image on the photoreceptor body is transferred onto a recording medium, which is synchronously transported from the recording medium feeding portion and thus returned, and the photoreceptor body is discharged by the discharge lamp (not shown). Simultaneously, a remainder of the developer on the surface of the photoreceptor body is removed by a rotary brush of the cleaning discharging unit (not shown), and the photoreceptor body is returned to an original state. The recording medium with the image transferred thereon is conveyed to a recording medium fusing unit. After the image is fixed on the recording medium at the recording medium fusing unit (not shown), the recording medium is discharged from the developing device.

Figure 6:
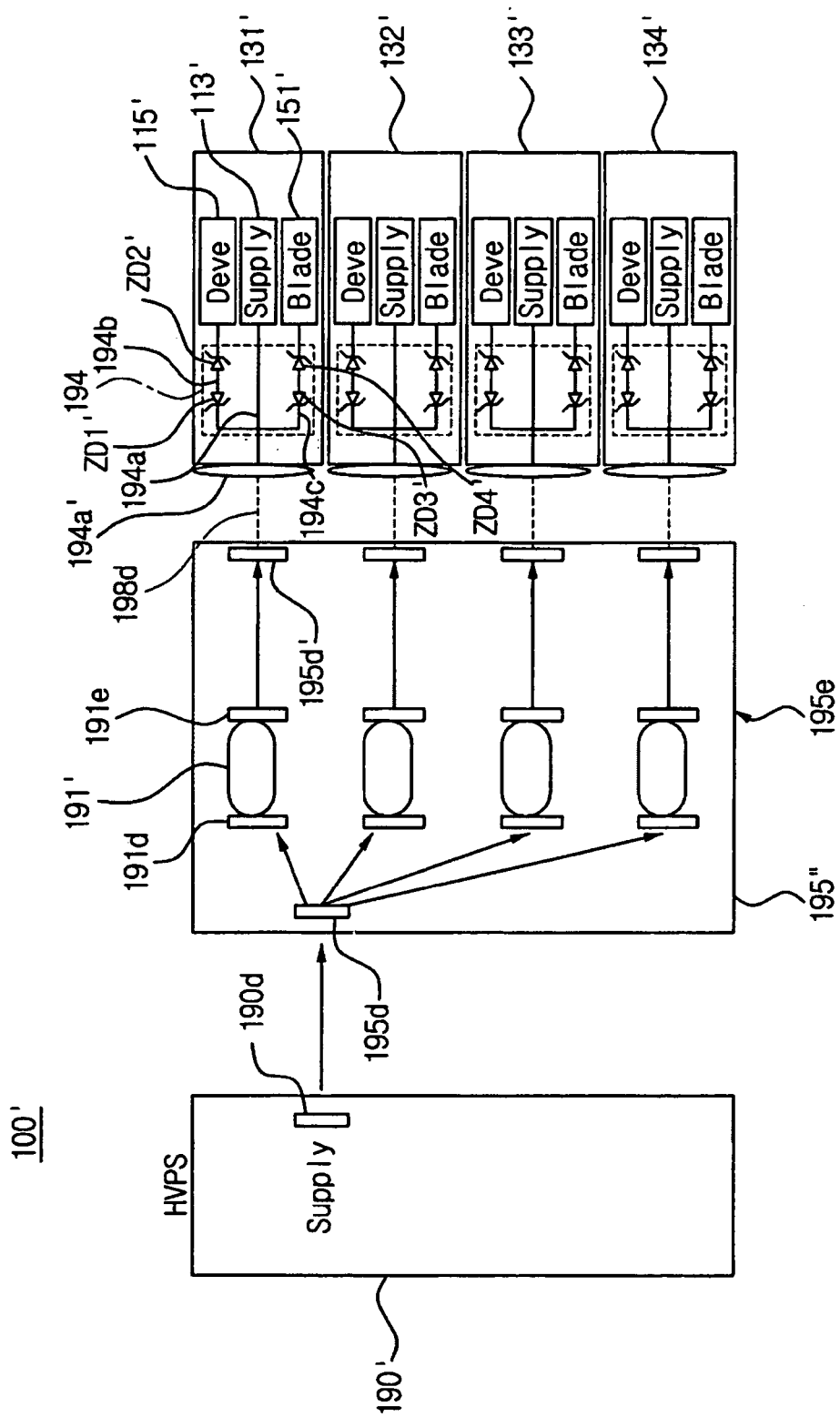
FIG. 6 is a schematic view of a power supply apparatus of a developing device used in an electrophotographic color image forming apparatus according to a second embodiment of the present invention.

Referring now to FIGS. 6 and 7, a voltage supply apparatus 100' according to a second embodiment of the present invention is shown.

As described with reference to FIG. 5, the voltage supply apparatus 100' includes a photoreceptor body (not shown) in a cylindrical drum shape, which forms an electrostatic latent image thereon by using an electric potential on a surface thereof, and four stationary developer units 131', 132', 133' and 134' having developer rollers fixed thereto with a predetermined gap with respect to the photoreceptor body.

For a purpose of supplying high voltage to the respective developer units 131', 132', 133' and 134', the voltage supply apparatus 100' includes a high voltage source 190' generating a high voltage, and a voltage switching unit 195" having a plurality of switching elements formed in an arrangement between the stationary developer units 131', 132', 133' and 134' and the high voltage source 190' to sequentially supply the voltage from the high voltage source 190' to the respective stationary developer units 131', 132', 133' and 134'.

The high voltage source 190' has a reference voltage unit 190d supplying only one voltage of a certain level (hereinafter, "reference voltage") to the voltage switching unit 195". Accordingly, a number of contact points of the wiring harness is reduced from that of the conventional power supply apparatus of FIG. 3 by 2 contact points.

The voltage switching unit 195" is formed of a coupling printed circuit board (PCB) 195e, and includes a PCB input terminal 195d connected with the reference voltage unit 190d of the high voltage source 190' via a wiring harness, four solenoids 191' switching to sequentially supply the reference voltage from the PCB input terminal 195d to the four stationary developer units 131', 132', 133' and 134', and four PCB output terminals 195d' outputting the reference voltage from the corresponding solenoids 191' to an outside of the coupling PCB 195e, and forming the voltage switching unit 195".

The PCB input terminal 195d is connected to the input terminals 191d of the solenoids 191' via four patterned connecting lines formed in the coupling PCB 195e.

As described above, the coupling PCB 195e of the second embodiment has one PCB input terminal 195d and one input terminal 191d for each of the solenoids 191', as in the first embodiment of FIG. 5. Thus, complicated patterned connecting lines, which were required for the conventional voltage supply apparatus (see FIG. 3), are not required.

As shown in FIG. 7, the output switching terminals 191e of the respective solenoids 191' are provided in an arrangement such that the output switching terminals 191e are switched to the corresponding PCB output terminals 195d', respectively, while the respective PCB output terminals 195d' are connected to respective input terminals 194a' of the stationary developer units 131', 132', 133' and 134' via respective spring terminals 198d formed at a lower portion of the coupling PCB 195e.

Each of the stationary developer units 131', 132', 133' and 134' includes a voltage distributing unit 194 branching the reference voltage fed to the input terminal 194a' via the spring terminal 198d into two output voltages and the reference voltage.

Each of the voltage distributing units 194 includes: a reference voltage transmitting unit 194a connected with the contact-point terminals 113' of the developer roller (not shown) of the corresponding stationary developer unit 131', 132', 133' or 134' to transmit the reference voltage; and first and second branch voltage generating units 194b and 194c formed in a parallel arrangement with the reference voltage transmitting unit 194a and connected with the contact-point terminals 115' and 151', respectively, of the developer feeding roller (not shown) and the developer layer thickness regulating member (not shown).

The reference voltage transmitting unit 194a is formed of an electric line connected to the contact-point terminals 113' of the developer roller. Each of the first and second branch voltage generating units 194b and 194c is formed of an electric line having a first pair of first and second zener diodes ZD1' and ZD2', and a second pair of third and fourth zener diodes ZD3' and ZD4' arranged in series and connected to the contact-point terminals 115' and 151' of the developer feeding roller and the developer layer thickness regulating member of the corresponding developer unit 131', 132', 133' or 134'.

However, a number of zener diodes provided to the first and second branch voltage generating units 194b and 194c is not limited to 2 diodes as in the first embodiment illustrated in FIG. 5. The number of zener diodes can vary appropriately depending on voltages required for the corresponding developer rollers, the corresponding developer feeding rollers and the corresponding developer layer thickness regulating members.

As described above, by supplying only one voltage from the high voltage source 190' to the voltage switching unit 195", the voltage supply apparatus 100' has simplified structure of a reduced number of wiring harnesses between the high voltage source 190' and the voltage switching unit 195" and a reduced number of patterned connection lines between the PCB input terminal 195d of the voltage switching unit 195" and the input terminals 191d of the respective solenoids 191'. Further, noise from the high voltage is reduced during the change of one stationary developer unit 131' 132', 133' or 134' to another stationary developer unit 131' 132', 133' or 134'.

Further, according to the second embodiment, since the respective stationary developer units are connected with the voltage switching unit 195" only via a single PCB input terminal 195d and a single input terminal 194a', the number of contact points for high voltage switching is reduced compared to a case of the voltage supply apparatus 100 of the first embodiment of the present invention and a reliability in the high voltage switching is improved.

An operation of the voltage supply apparatus 100' constructed according to the second embodiment is similar to that of the first embodiment, except that the reference voltage from the high voltage source 190' is branched into reference voltage and two voltages of different levels at the respective developer units 131', 132', 133' and 134' instead of the voltage switching unit 195", to supply to the respective developer rollers, the respective developer feeding rollers and the respective developer layer thickness regulating members. Accordingly, detailed description thereof will be omitted here.

As described above, with the voltage supply apparatus, a single high voltage from a high voltage source is branched for use by voltage distributing units formed at a voltage switching unit or at respective developer units into different levels as required. Accordingly, a number of wiring harnesses or patterned connection lines, and contact-points for high voltage switching to supply a high voltage from the high voltage source to the voltage switching unit, or from the high voltage source to the respective developer units is greatly reduced, and thus, noise from the high voltage is reduced during a change of one stationary developer unit to another stationary developer unit. Further, a reliability in high voltage switching is improved.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for supplying a voltage to a plurality of developer units, comprising:

a high voltage source to generate a voltage;

a voltage switching unit comprising:

a plurality of switching elements provided between the plurality of developer units and the high voltage source to sequentially supply the voltage from the high voltage source to the plurality of developer units, the high voltage source supplying one voltage of a predetermined voltage level to respective switching elements of the voltage switching unit, and a plurality of high voltage distribution units to branch the voltage supplied to the switching elements into one or more voltages of differing voltage levels, and to supply the branch voltages and the one voltage of the predetermined voltage level to the respective developer units.

2. The apparatus of claim 1, wherein each of the high voltage distribution units comprises:

an output terminal of the voltage switching unit to connect with a respective one of stationary contact-point terminals of each of the developer units;

a reference voltage transmitting unit to transmit the one voltage, between the output terminal of the voltage switching unit and a corresponding one of the switching elements;

one or more remaining output terminals of the voltage switching unit; and one or more branch voltage generating units arranged in parallel with the reference voltage transmitting unit and connected to the one or more remaining output terminals of the voltage switching unit and comprising one or more zener diodes, the remaining output terminals of the voltage switching unit being connected with remaining ones of the stationary contact-point terminals of each of the developer units which require high voltage.

3. The apparatus of claim 2, wherein each of the branch voltage generating units comprise:

two zener diodes arranged in a series thereof.

4. The apparatus of claim 3, wherein:

the voltage switching unit comprises a printed circuit board; and the switching elements comprise solenoids.

5. An apparatus for supplying voltages to developer units, comprising:

a high voltage source to generate a voltage;

a voltage switching unit comprising:

a plurality of switching elements provided between the plurality of developer units and the high voltage source to sequentially supply the voltage from the high voltage source to the plurality of developer units, the high voltage source supplying one voltage of a predetermined voltage level to the respective switching elements of the voltage switching unit; and a plurality of the developer units, each comprising a high voltage distribution unit to branch the one voltage supplied via the corresponding switching element into one or more branch voltages, and to supply the one or more branch voltages and the one supplied voltage.

6. The apparatus of claim 5, wherein:

the voltage switching unit further comprises a plurality of output terminals thereof to connect with the switching elements; and each of the high voltage distribution units comprises:

an input terminal thereof;

a reference voltage transmitting unit to transmit the one voltage between the input terminal of the developer unit and one of contact-point terminals of the developer unit which require high voltage, the input terminal of the developer unit being connected with each of the plurality of output terminals of the voltage switching unit which are connected with the switching elements; and one or more branch voltage generating units arranged in parallel with the reference voltage transmitting unit, and connected with remaining ones of the contact-point terminals of the developer unit which require high voltages, and each of the branch voltage generating units having one or more zener diodes.

7. The apparatus of claim 6, wherein the branch voltage generating unit comprises two zener diodes arranged in a series thereof.

8. The apparatus of claim 7, wherein:

the voltage switching unit comprises a printed circuit board; and the switching elements comprise solenoids.

9. An apparatus for supplying voltages to a plurality of developer units, and having a high voltage source to generate a voltage, comprising:

a plurality of switching elements provided between the plurality of developer units and the high voltage source to sequentially supply the voltage to the plurality of developer units, the high voltage source to supply a voltage of a predetermined voltage level to a respective one or ones of the plurality of switching elements, and high voltage distribution units to branch the voltage supplied to the switching elements into one or more voltages of differing voltage levels, and to supply the branch voltages together with the voltage of the predetermined voltage level to a respective one or ones of the developer units.

10. The apparatus of claim 9, wherein each of the high voltage distribution units comprises:

a transmitting unit connected to the voltage source to transmit the voltage of the predetermined voltage level to a corresponding one or ones of the switching elements;

one or more voltage generating units arranged with the transmitting unit and reducing the voltage of the predetermined voltage level to different voltage levels to supply voltages of the different voltages level to a respective one or ones of the developer units.

11. The apparatus of claim 10, wherein each of the high voltage distribution units further comprises:

an output terminal of the transmitting unit to connect with a respective one of terminals of each of the developer units; and one or more output terminals of the one or more voltage generating units, respectively, to connect with one or more remaining output terminals of the developer unit.

12. The apparatus of claim 11, wherein each of the voltage generating units comprise:

a voltage reducing unit to reduce the voltage of the predetermined voltage level to a voltage of a reduced voltage level such that each of the voltages supplied to the developer unit differs in a voltage level thereof.

13. The apparatus of claim 11, wherein each of the voltage generating units comprise:

one or more zener diodes connected in a series with the transmitting unit to supply a voltage to the one or more remaining output terminals of the developer unit.

14. The apparatus of claim 13, wherein each of the voltage generating units comprises: two zener diodes arranged in a series thereof.

15. The apparatus of claim 14, wherein:

the voltage switching unit comprises a printed circuit board; and the switching elements comprise solenoids.

16. The apparatus of claim 13, wherein, in each of the branch voltage generating units, a number of series arranged zener diodes is determined according to a constant voltage required by one of developer rollers and developer feed rollers.

17. The apparatus of claim 9, wherein the high voltage distribution units provide at least three different voltage levels to each of the developer units.

18. An apparatus for supplying voltages to development units, and having a high voltage source to generate a voltage, comprising:

a plurality of switching elements provided between the plurality of developer units and the high voltage source to sequentially supply the voltage to the plurality of developer units, the high voltage source to supply a voltage of a predetermined voltage level to the plurality of switching elements; and a plurality of developer units, each comprising
plural high voltage distribution units to branch the voltage of the predetermined voltage level supplied via the corresponding switching element into one or more branch voltages, and to supply the one or more branch voltages together with the voltage of the predetermined voltage level therein.

19. The apparatus of claim 18, wherein:
the plurality of switching elements, each comprise
an output terminal thereof; and
each of the high voltage distribution unit comprises:
an input terminal of the developer unit to connect with an output terminal of a corresponding switching element,
a transmitting unit to transmit the voltage of the predetermined voltage level between the input terminal of the developer unit and one of contact-point terminals of the developer unit which require high voltage, and
one or more branch voltage generating units arranged with the transmitting unit, and connected with remaining ones of the contact-point terminals of the developer unit, and having one or more zener diodes.

20. The apparatus of claim 19, wherein the branch voltage generating unit comprises
two zener diodes arranged in a series thereof.

21. The apparatus of claim 20, wherein, in each of the branch voltage generating units, a number of series arranged zener diodes is determined according to a constant voltage required by one of developer rollers and developer feed rollers.

22. The apparatus of claim 19, wherein:
the voltage switching unit comprises a printed circuit board; and
the switching elements comprise solenoids.

23. The apparatus of claim 18, wherein the high voltage distribution units provide at least three different voltage levels to each of the developer units.

* * * * *